United States Patent [19]

Chalendard

[11] Patent Number: 4,795,897
[45] Date of Patent: Jan. 3, 1989

[54] APPARATUS FOR ESTABLISHING DATA TRANSFERS WITH A PORTABLE ELECTRONIC CARD

[75] Inventor: Hervé Chalendard, Bry sur Marne, France

[73] Assignee: U.S. Philips Corp., New York, N.Y.

[21] Appl. No.: 185,357

[22] Filed: Apr. 18, 1988

Related U.S. Application Data

[63] Continuation of Ser. No. 16,170, Feb. 19, 1987, abandoned.

[30] Foreign Application Priority Data

Feb. 21, 1986 [FR] France .................. 86 02401

[51] Int. Cl.⁴ .................................. G06K 13/00
[52] U.S. Cl. ........................................ 235/482
[58] Field of Search ............................. 235/482

[56] References Cited

U.S. PATENT DOCUMENTS

| | | | |
|---|---|---|---|
| 4,114,828 | 9/1978 | Baio | 235/482 X |
| 4,404,464 | 9/1983 | Moreno | 235/438 |
| 4,443,049 | 4/1984 | De Pommery et al. | 339/75 |
| 4,449,775 | 5/1984 | De Pommery et al. | 339/74 |
| 4,575,703 | 3/1986 | Shishido | 235/479 |

FOREIGN PATENT DOCUMENTS

| | | |
|---|---|---|
| 0150600 | 8/1985 | European Pat. Off. . |
| 0157035 | 9/1985 | European Pat. Off. . |
| 0167356 | 1/1986 | European Pat. Off. . |
| 2400820 | 3/1979 | France . |

Primary Examiner—Harold I. Pitts
Attorney, Agent, or Firm—Thomas A. Briody; Jack E. Haken; Anne E. Barschall

[57] ABSTRACT

An apparatus for data transfer with a portable electronic card, for example a payment card or a credit card. It comprises a housing into which a card is introduced. When the card is introduced, a hook is taken along, which is connected to a carriage, which carries compression springs in the form of laminations moulded from one piece with the carriage and which press a flexible insulating foil against the card when due to the introduction of the card the carriage is lowered to the latter by guiding means. The part of the film which is pressed against the card carries metallic contact elements connected through conductive leads to another part of the same foil, which part carries the electronic elements which ensure data processing.

16 Claims, 2 Drawing Sheets

APPARATUS FOR ESTABLISHING DATA TRANSFERS WITH A PORTABLE ELECTRONIC CARD

This is a continuation of application Ser. No. 16,170, filed Feb. 19, 1987, now abandoned.

BACKGROUND OF THE INVENTION

1. Field of the Invention

The invention relates to an apparatus adapted to receive a portable electronic card, for example a payment card or a credit card, which apparatus comprises a housing provided with an opening for introducing the card, the latter being provided with at least one integrated circuit comprising a memory by means of which a data transfer can be established in that the card is inserted into the housing, the said housing being provided with a movable part which is taken along by the card and serves as an intermediary for establishing an electrical connection between the card and a circuit outside the card during the data processing.

2. Prior Art

Apparatus of the kind defined above are described, for example, in French Patent Nos. FR-A-445560, FR-A-2415378 and U.S. Pat. No. 3,789,345. According to these patents, the apparatus comprises a movable part displaced by the introduction of the card and carrying contacts which will be applied to the card under the influence of a displacement of the movable part.

In this type of apparatus, the contacts connected to the movable part are themselves movable and a difficulty is involved in connecting these movable contacts to an external electronic circuit fixed to the housing. The connection can be established by flexible wires, as indicated in French patent No. FR-A-2445560 (Ref. 40 - FIG. 2B) and in French patent No. FR-A-2415378 (Ref. 4a, 4b, FIGS. 1 and 2). At the stage of manufacture, these devices require that numerous wires be prepared and the two ends of each wire be connected, for example by soldering or by means of a connector. These numerous connections are expensive and they create moreover possible sources of errors. Another solution is provided by U.S. Pat. No. 3,789,345, in which laminations (22) connected to the movable part (10) get into contact with fixed parts (26) at the end of the path of the movable part. This has the disadvantage that a supplementary non-soldered contact is introduced, which increases the risk of false contacts.

SUMMARY OF THE INVENTION

The invention has for its object to provide a means for establishing a connection between the movable contact surfaces connected to the movable part and to the fixed circuit. The means should have a very low cost and not introduce any intermediate connection, which would be a source of false contacts. For this purpose, the apparatus according to the invention is characterized in that the movable part is provided with at least one compression spring, which presses a contact element printed on an insulating flexible foil against a contact element of the card during data processing, and in that a part of this foil carrying the said contact element and printed connections is fixed to the movable part and is displaced with respect to the housing simultaneously with this movable part, while another part of the foil is fixed to the housing.

Advantageously, the part of the insulating flexible printed foil which is fixed to the housing carries essential components of the said circuit outside the card. This permits avoiding any intermediate supplementary connection, which would be a source of errors and of increase in cost.

The apparatus of the type envisaged in this case often comprise a control keyboard and the advantages of the invention are then best utilized if a part of the insulating flexible foil itself constitutes one of the foils of the keyboard, the latter being of the type having metallized foils between which a perforated interposed foil is arranged. Such key boards are described in numerous patents, among which can be mentioned French patent application No. FR-A-2400820, European patent application No. EP-A-0157035 and European patent application No. EP-A-0150600.

In order to simplify the construction of the apparatus, it is advantageous that the compression spring and the movable part be formed from one piece. Thus, the movable part being moulded, for example, from a plastic substance, it is moulded simultaneously with the springs, as a result of which a step of mounting springs is economized. In order to ensure an accurate positioning of the contact element of the flexible foil, means for fixing it are advantageously carried by the compression springs themselves rather than by rigid portions of the movable part. Moreover, this arrangement has the advantage that it involves that the foil slides a little with respect to the card, which has a self-cleaning effect.

BRIEF DESCRIPTION OF THE DRAWINGS

In order that the invention may be readily carried out, it will now be described more fully, by way of example, with reference to the accompanying drawings, in which.

DETAILED DESCRIPTION OF THE PREFERRED EMBODIMENT

Figure 1:
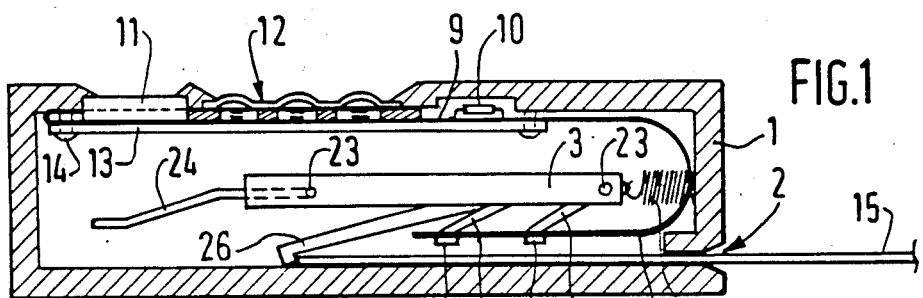
FIGS. 1 and 2 show diagrammatically in sectional view an apparatus according to the invention, the card and the movable part being in the rest position and in the data transfer position, respectively.

FIG. 1 shows an apparatus according to the invention adapted to receive a portable electronic card, for instance an identification card, a payment card or a credit card. This apparatus comprises a housing 1 provided with an opening 2 for introducing the card 15. The housing 1 is provided with a movable part 3 or a carriage, which is taken along by the card 15 by means of an elastic hook 26 which is integral with the carriage and is hooked by the front end(shown in the lefthand part of the figure) of the card 15 when the latter is pushed to the interior of the housing. The housing moreover comprises an electronic circuit 9 to 11 outside the card fixed to the housing 1.

The carriage 3, which serves as an intermediary for establishing an electrical connection between the card and the electronic circuit outside the card, is provided for this purpose with compression springs 4, which are arranged on the righthand side of contact elements 5 printed on a flexible insulating foil 6. The carriage 3 is guided so that it remains parallel to itself and approaches the card at the same time at which the carriage and the card are pushed together to the bottom of the housing, shown in the lefthand part of the Figure. These guide means are constituted by, for example, pins 23 carried by the carriage and slots 24 carried by the housing cooperating with each other to ensure the translatory movement of the carriage with respect to the housing. Moreover, a spring 33 is provided to return the carriage to the rest position.

Figure 2:
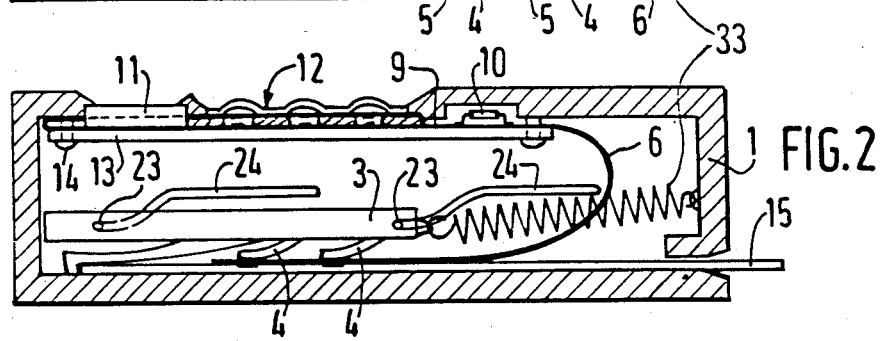
Figure 4:
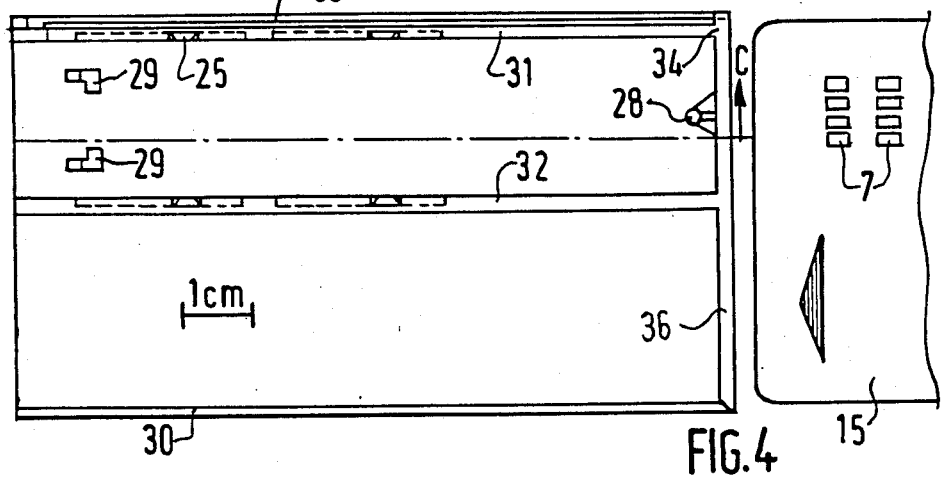
FIG. 4 is a plan view of the same part.
Figure 5:
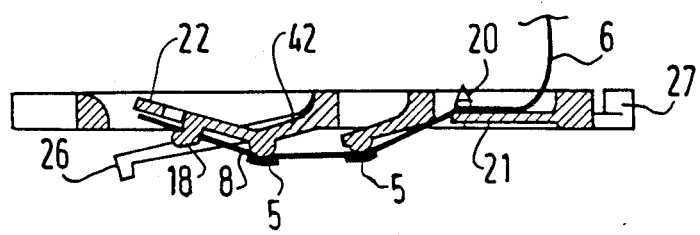
FIGS. 5 to 7 show the movable part in several lateral sectional planes.
Figure 6:
Figure 7:
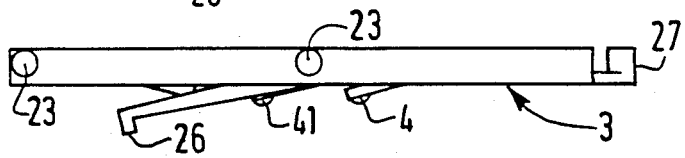

FIG. 2 shows the same apparatus with the carriage in the working position, the card 15 being completely inserted into the apparatus, while the carriage is lowered and the compression springs 4 are bent and press the film 6 against the card 15. This card, of which a part is visible in plan view in the righthand part of FIG. 4, is provided with at least one integrated circuit (not shown) comprising a memory with which a data transfer can be established by means of contact connection elements 7 arranged at the surface of the card, when the latter is introduced into the housing. The springs 4 consequently press the contact elements 5 of the foil 6 against the contact elements 7 of the card 15, which permits obtaining the electrical connection required to carry out a data transfer between the integrated circuit of the card and the external circuit fixed to the housing.

A part of the foil 6 carrying the contact elements 5 is connected to the carriage 3 and is displaced with respect to the housing simultaneously with the carriage, while another part 9 of the foil is fixed to the housing.

Figure 9:
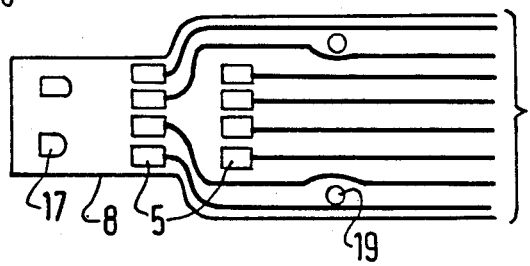
FIG. 9 shows the part of the flexible foil which is connected to the movable part.

This foil carries printed connections, which will be described with reference to FIG. 9, to connect the contact elements 5 to the electronic circuits 9 to 11. Moreover, the part 9 fixed to the housing directly constitutes a substrate carrying essential components of the said circuit outside the card. These components are, for example, miniaturized encapsulated circuits, resistors, capacitors and other elements indicated diagrammatically by reference numeral 10, a liquid crystal display device 11 and a keyboard 12. The latter of a known type is constituted from top to bottom successively by: a bubbled foil having a distinct click effect, a flexible insulating foil carrying contacts, an interposed perforated foil on the righthand side of the contacts of the upper foil and a second flexible insulating foil carrying contacts opposite to those of the upper foil. The lower foil is constituted by a fixed part 9 of the same foil 6, which carries the contacts for connection with the card and the upper foil is also constituted by another part folded from the same foil 6, 9. A rigid plate 13 is arranged below the assembly fixed to the housing by an arbitrary means in order to support the keyboard 12 and the circuit 9.

Figure 3:
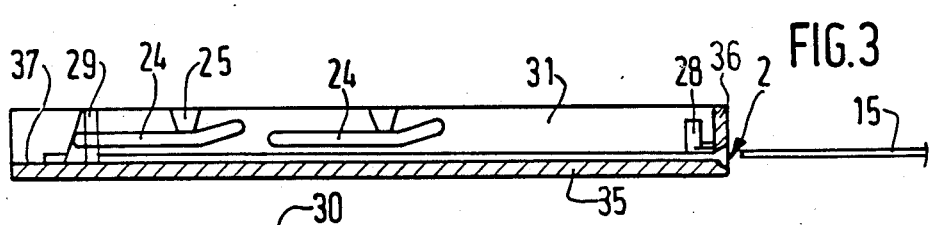
FIG. 3 is a lateral sectional view of an embodiment of a part of the housing.

The mechanical elements shown in FIGS. 3 and 4 represent in detail an embodiment of the part of the housing which serves to guide the card and the carriage. It is constituted by a bottom plate 35 having lateral walls 30 and by a front wall 36 in which the entrance opening 2 for the card 15 is provided. It moreover carries two beams 31 and 32 which are hooked to the front at 34 and to the base plate at 37 and in which the slots 24 are formed. Inclined parts 25 are provided to permit
readily introducing the carriage between the slots by elastic flexion of the beams 31 and 32. The card portion indicated in the righthand part gives the scale of the drawing. It is not useful for the carriage to have a width of the same order as that of the card. It is sufficient that it covers the part of the card carrying the contacts 7.

Therefore, the two beams 31, 32 are arranged on either side of the position occupied by these contacts when the card is introduced into the apparatus. The columns 29 serve to hold in place a device which is not shown and does not form part of the invention intended to ensure that the carriage stops and to detect the carriage's arrival at its stopping point.

Figure 8:
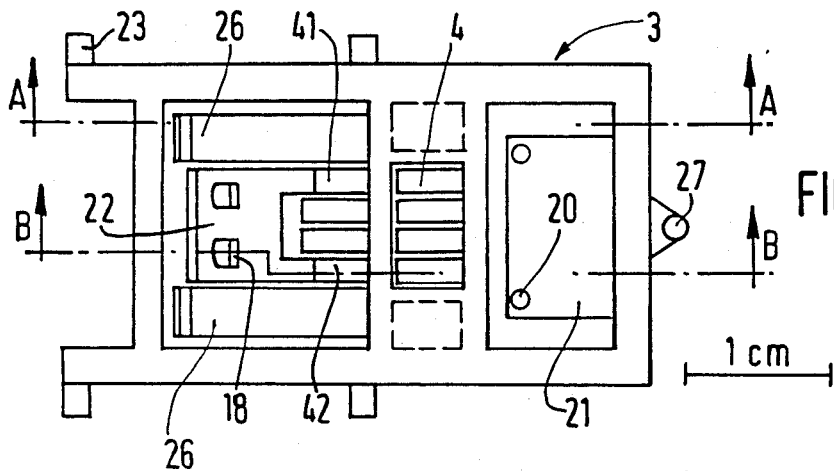
FIG. 8 shows in plan view the movable part.

FIGS. 5 to 8 show several elevations of the carriage 3. The scale is indicated in FIG. 8; it is larger than that of FIG. 4, in which the carriage of FIG. 8 has to be introduced between the beams 31 and 32. The carriage is provided with a first group of four compression springs, one of which is designated by reference numeral 4, and with two compression springs 41 and 42 between which further two compression springs are arranged which are identical to those of the first group. The two springs 41 and 42 are stretched by a part 22 which interconnects them and carries hooks 18 intended to fix the flexible foil 6 in the manner shown in FIG. 5. When the film is fixed in this manner, when the compression springs are pressed, the hooks 18 take along the film and cause the film to slide over the card, which ensures a self-cleaning of the contacts. The film passes through the carriage and extends upwards to the circuit fixed to the housing and it is fixed to the carriage at another point by means of pointed pins 20 fixed to a flexible plate 21, which ensures that the foil is stretched between the hooks 18 and the pointed pins 20.

FIGS. 7 and 8 show again the pins 23 and the hooks 26 already mentioned. The hooks 26 are two in number in order to ensure that the carriage is taken along symmetrically.

The compression springs are provided with bearings in the form of a hemisphere or a semi-cylinder in order to concentrate the pushing force on the foil. All the elements of the carriage, more particularly the hooks 26, the springs, the bolts 23 and the part 21 are moulded together, for example from polycarbonate.

A stud 27 permits hooking a return spring, of which the other end is hooked to a similar stud 28 shown in FIG. 4.

The embodiment of the part of the flexible foil connected to the carriage (shown in FIG. 9) comprises the printed contact elements 5 already mentioned, whose arrangement corresponds to that of the end of the spring of the carriage 3 and obviously also to that of the contact elements of the card. It carries metallized leads 16 connected to each of the contact elements 5 and it is provided with holes 17 ensuring the hooking to the hooks 18 of the carriage and with holes 19 ensuring the hooking to the pointed pins 20 of the carriage. It is manufactured, for example, from polyimide having a thickness of 150/μm.

The apparatus described here requires that the card be introduced manually and that it be held in position during the data transfer. Any arbitrary device may be provided to validate this transfer when the card is in the correct position and only in this case. Of course the invention may be used in all embodiments of reading apparatus inclusive of those comprising a motor and pulling sprockets for introducing the card.

What is claimed is:
1. Apparatus for receiving a portable electronic card which includes at least one integrated circuit with a memory and at least one internal contact element coupled with the memory, the apparatus comprising:
  a. a housing defining an opening for introducing the card;
  b. a slide within the housing, the slide serving as an intermediary for establishing an electrical connection between the card and a circuit outside the card;
  c. a slope within the housing, the slope being disposed so that the slide is taken along the slope by insertion of the card;
  d. at least one spring carried by the slide; and
  e. a flexible insulating foil, carried by the spring, which flexible insulating foil carries at least one external contact element, so that the at least one spring presses the at least one external contact against the at least one internal contact element, after the card is inserted, to establish data transfer between the circuit outside the card and the memory of the card, the same at least one spring being biased between the slide and the flexible insulating foil during said data transfer.

2. The apparatus of claim 1 wherein the flexible insulating foil: comprises a part which is fixed to the housing, is printed, and carries essential components of the circuit outside the card.

3. The apparatus of claim 2 further comprises means for coupling to a control keyboard having metallized flexible foils with a spacer foil therebetween, the coupling means comprising the fixed part which comprises at least one of the foils of the keyboard.

4. The apparatus of claim 1 wherein the at least one spring and the slide are formed from one piece.

5. The apparatus of claim 4 wherein the at least one spring and the slide are made of molded plastic.

6. The apparatus of claim 1 wherein the at least one spring comprises means for fixing the flexible insulating foil.

7. The apparatus of claim 1 wherein:
  a. the housing comprises one of: a plurality of pins and a plurality of slots; and
  b. the slide comprises the other of: the plurality of pins and the plurality of slots, the pins and slots cooperating with each other to ensure translatory movement of the slide with respect to the housing; and
  c. the apparatus further comprises an elastic hook for ensuring that the slide is taken along by the card.

8. The apparatus of claim 7 wherein the slide and the elastic hook are formed from a single piece.

9. An apparatus adapted to receive a portable electronic card comprising a housing provided with an opening for introducing the card, said card being provided with at least one integrated circuit with a memory with which a data transfer is established after insertion of the card in the housing by means of at least one external contact element in the housing being pressed against at least one internal contact element of the card, said housing being provided with a slide which is taken along a slope by insertion of the card and serves as an intermediary for establishing an electrical connection between the card and a circuit outside the card during data processing, said slide carrying at least one spring pressing said external contact element against said internal contact element, wherein the improvement comprises that said spring carries a flexible insulating foil which is provided with said external contact, said spring being biased between said slide and said flexible insulating foil during said data transfer.

10. The apparatus of claim 9 wherein:
  a. the housing comprises one of: a plurality of pins and a plurality of slots; and
  b. the slide comprises the other of: the plurality of pins and the plurality of slots, the pins and slots cooperating with each other to ensure translatory movement of the slide with respect to the housing; and
  c. the apparatus further comprises an elastic hook for ensuring that the slide is taken along by the card.

11. An apparatus as claimed in claim 9, wherein the flexible insulating foil: comprises a part which is fixed to the housing, is printed, and carries essential components of the circuit outside the card.

12. An apparatus as claimed in claim 11, wherein the fixed part of the flexible insulating foil is at least one of the foils of a control keyboard of the apparatus, which keyboard is of the type having metallized flexible foils with a spacer foil between them.

13. An apparatus as claimed in claim 9 wherein the at least one spring and the slide are formed from one piece.

14. An apparatus as claimed in claim 13, wherein the slide and the at least one spring are made of moulded plastic material.

15. An apparatus as claimed in claim 9 wherein the at least one spring is provided with means for fixing the flexible insulating foil.

16. An apparatus as claimed in claim 10 wherein the elastic hook and the movable part are formed from one piece.

* * * * *